(12) United States Patent
Göransson

(10) Patent No.: US 6,250,142 B1
(45) Date of Patent: Jun. 26, 2001

(54) WAVINESS MEASUREMENT

(75) Inventor: Bo Göransson, Göteborg (SE)

(73) Assignee: SKF Nova AB, Gothenburg (SE)

( * ) Notice: Subject to any disclaimer, the term of this patent is extended or adjusted under 35 U.S.C. 154(b) by 0 days.

(21) Appl. No.: 09/218,069

(22) Filed: Dec. 22, 1998

(30) Foreign Application Priority Data

Dec. 22, 1997 (SE) .................................................. 9704864

(51) Int. Cl.[7] .............................. G01B 5/28; G01B 7/34; G01B 13/22; G01M 13/04
(52) U.S. Cl. .................................................... 73/105
(58) Field of Search ...................................... 73/104, 105

(56) References Cited

U.S. PATENT DOCUMENTS 5,565,623 * 10/1996 Philpott et al. ..................... 73/105

FOREIGN PATENT DOCUMENTS

| 2742326 | * | 3/1979 | (DE) | 73/104 |
| 314 214 | | 9/1969 | (SE) | |
| 526771 | * | 10/1976 | (SU) | 73/105 |
| 1193475 | * | 11/1985 | (SU) | 73/104 |

* cited by examiner

Primary Examiner—Daniel S. Larkin
(74) Attorney, Agent, or Firm—Burns, Doane, Swecker, Mathis, L.L.P.

(57) ABSTRACT

A method and apparatus for measuring the waviness of surfaces of, for example, bearing parts involves the use of a control element that is rotatably applied against a surface of the object to be measured. The control element has a similar geometry to the final bearing component and is placed in a hydrostatic pocket, or kept in a bearing arrangement, allowing it to rotate and move freely. The control element is loaded with a substantially constant force and is arranged to be moved rotatably across the surface to be tested. At least one transducer is arranged to monitor the direct movement of the control element or the movement via the pocket, and a signal is created corresponding to the waviness.

19 Claims, 3 Drawing Sheets

WAVINESS MEASUREMENT

Figure 1:
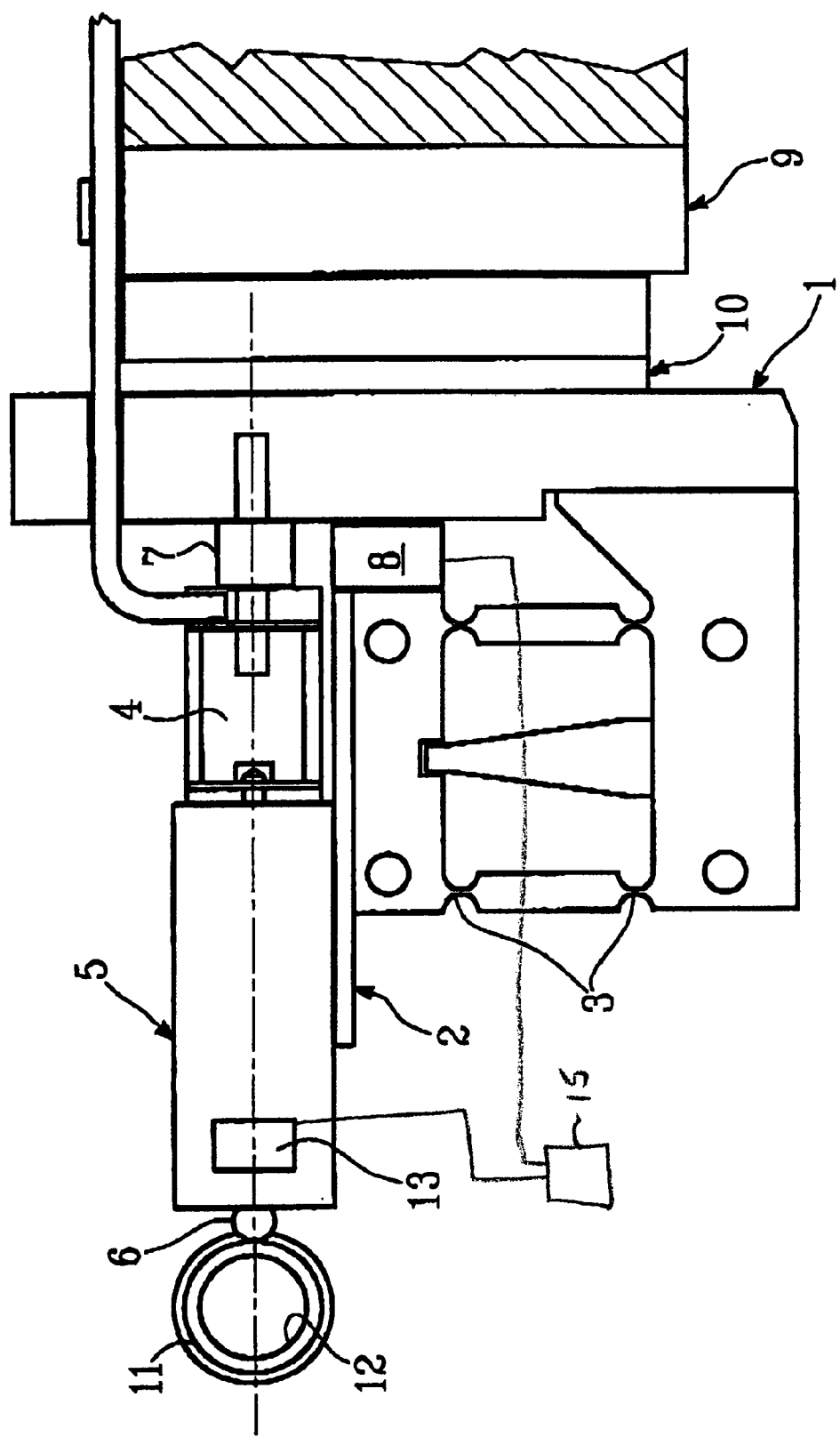

This application corresponds to and claims priority under 35 U.S.C. § 119 with respect to Swedish Application No. 9704864-9 filed on Dec. 22, 1997, the entire content of which is incorporated herein by reference.

FIELD OF THE INVENTION

The present invention generally relates to an apparatus for measuring waviness of surfaces. More particularly, the present invention pertains to an apparatus for measuring the waviness of surfaces of bearing parts, such as the rolling elements of bearing parts (i.e., balls, rollers and bearing rings) using a control element that is rotatably applied against a surface to be checked.

BACKGROUND OF THE INVENTION

The poor correlation between waviness and actual vibration measurements of assembled bearings at least for higher frequencies is a significant problem, as the vibrations cannot always be predicted after a waviness measurement using known technology. Also, known technology for effecting such a waviness measurement makes the measurement process rather time consuming.

Before now, it has only been possible to determine amplitude variations on the order of one hundred to ten nanometers in the production environment. However, a need exists for a method and apparatus that are able to measure amplitudes of a much smaller size. Such amplitudes might be on the order of or a part of the diameter of an atom or smaller.

The measurement is in particular needed for high precision bearings used in high precision instruments, bearings used in high speed applications such as household equipment and computer hard disc motors, and other applications to reduce noise caused by vibrations at a high frequency. Thus, the need for measuring apparatus and methods along the lines mentioned above is particularly acute in bearings where the bearing noise can be particularly disturbing because it occurs as a high frequency noise and in noise and vibration sensitive applications.

In the past, a lightly loaded pick-up has been used for measuring the waviness of different parts of bearings, such as balls, rollers, and rings. The pick-up is run in one or more narrow pathways on the surface to be tested. Variations in the bearing material, such as inhomogenities and surface roughness, influence the efficient waviness of the bearing, but is typically not correctly registered by the pick-up. The pick-up method thus does not measure all relevant effects which occur in real applications. The surface structure affects the pick-up in quite another way than a higher loaded rolling or rotating body working on a surface.

The difference might be due to the fact that only a fraction of the raceway area is measured, that local variations of the e-module in the subsurface material appear and affect the measurement; and/or that the EHD-film (ElastoHydroDynamic-film) thickness varies due to surface effects.

The rolling of a ball on a ring in a bearing affects the material down to, for example, a depth of thirty to forty microns on a small bearing, while a pick-up does not have such an impact on the material. This changes the requisites for a correct measurement of the functional behavior of the bearing. Additionally, a ball on a bearing ring is affected by the whole contact area and so by measuring just a fraction of the area it is thus not normally representative for the integrated value of the whole area.

It is of importance to measure the surface waviness of a bearing and its parts to obtain a tool or mechanism useful in quality determination after assembling such parts, i.e., so that the vibrations of the bearing can be predicted. It is of further importance to be able to control the process quality and thereby control the process equipment with regard to wear and other process parameters.

SE-C-314 214 discloses a method for testing the rotary movement of balls using a testing roller to check for the quality of the surface layer, the surface, or the shape. The roller is brought to act upon a ball with its surface being changeably active due to its shape. This document is not disclosed in the context of measuring waviness, but larger irregularities or unevenesses on the surface. The disclosed method is particularly adapted for use in connection with large balls.

In light of the foregoing, a need exists for a way of measuring the waviness of surfaces with higher accuracy than previously possible.

A need also exists for measuring the waviness on a larger surface (e.g., an adequate surface when considering a bearing surface) than with previously known apparatus to provide a functionality related integration, thereby making it possible to measure and integrate the influence of surface structure and surface roughness.

A need also exists to be able to produce bearings of higher quality, where the vibrations of a complete bearing can be predicted in an accurate manner.

A further need exists for controlling the process conditions under which the bearing parts are manufactured, as condition variations in the process will be monitored and considered.

SUMMARY OF THE INVENTION

In light of the foregoing, the present invention provides a method and apparatus for testing the waviness of surfaces, in particular the surfaces of balls, rollers and rings to be used in assembling bearings. A loaded element having a geometry similar to the geometry of the object of the final bearing is placed in a hydrostatic pocket and is loaded with a constant force. The element is adapted to be moved across the surface to be tested while a transducer monitors the movement of the element via the hydrostatic pocket, thus producing a signal corresponding to the surface waviness.

It is important to measure the surface waviness of a bearing to provide a tool or mechanism for separating bearings into different categories of quality (i.e., so that the vibrations of a bearing can be predicted). By virtue of the present invention, the waviness can be very accurately monitored, and by using a subsequent processing of the signal obtained, the signal related to the testing element can be separated from the signal related to the object tested. In this way, the waviness of the object tested can be registered or determined under conditions and geometries very similar to the actual existing conditions in the bearings.

According to another aspect of the invention, an apparatus for measuring the waviness of a surface in a bearing part that is adapted to cooperate with a bearing component to form an assembled bearing includes a movable control element that is to be applied against the surface of the bearing part to be measured, with the control element having a geometry similar to a geometry of the bearing component. The control element is carried in such a way as to allow free rotation of the control element. A device is provided for applying a load force to the control element to press the control element against the surface of the bearing part to be measured, and a device is provided for carrying and rotating the bearing part to be tested. At least one sensor measures the movement of the control element, and a device is provided to produce, based on the output from the sensor, a signal corresponding to the waviness of the surface of the bearing part.

BRIEF DESCRICRIPTION OF THE DRAWING FIGURES

Figure 2:
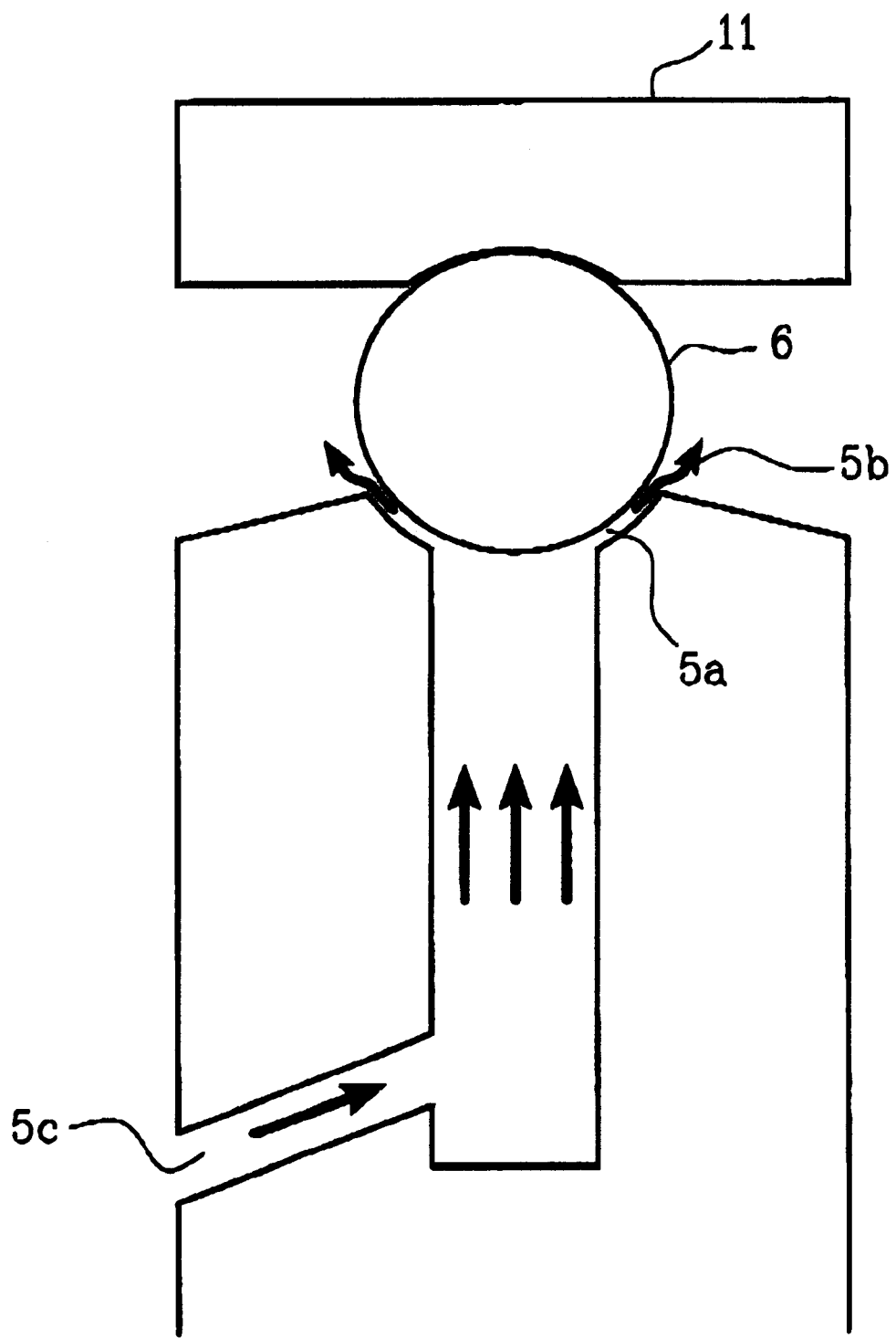
Figure 3:
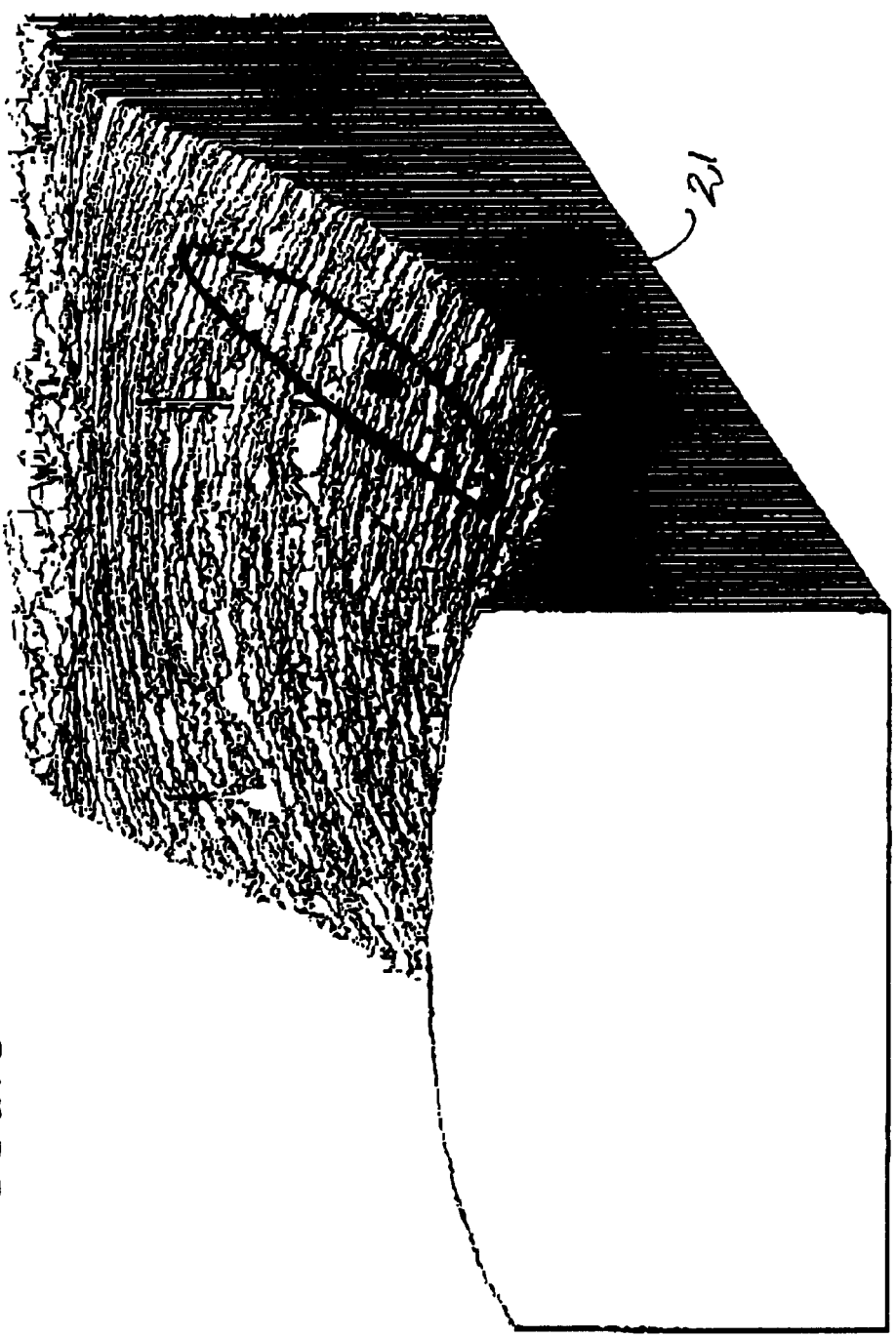

Additional features and characteristics of the present invention will become more apparent from the following detailed description considered with reference to the accompanying drawing figures in which:

FIG. 1 schematically illustrates an apparatus according to one embodiment of the present invention;

FIG. 2 illustrates a portion of the apparatus shown in FIG. 1 depicting the rolling/rotating element positioned in the hydrostatic pocket; and FIG. 3 shows a section of a ring wherein the abutment areas of a known pick-up and an element of the present invention, respectively, are denoted.

DETAILED DESCRIPTION OF THE INVENTION

With reference initially to FIG. 1, the apparatus according to the present invention for measuring the waviness of surfaces includes a body 1 carrying a bridge 2 connected to the body 1 via several bending joints 3. The bending joints 3 are preferably integral parts of the body 1 and the bridge 2. An air bellow 4 is fixedly provided on the bridge 2 and a hydrostatic pocket 5 is operatively associated with the air bellow 4. The bellow 4 is adapted to load or apply a substantially constant force to the hydrostatic pocket 5 into which a rolling or rotating element 6 is arranged.

Disposed on the end of the air bellow 4 that is opposite to the hydrostatic pocket 5 is a load sensor 7 which monitors the load force applied onto the hydrostatic pocket 5 by way of the air bellow 4. The bridge 2 is provided with a capacitive sensor 8 which monitors the movement of the bridge 2 in the bending joints 3.

The body 1 is further connected to a fixed plate 9 via a bending joint 10. The fixed plate 9 is an integral part of the whole assembly. The bending in the bending joint 10 is registered or measured via a sensitive sensor 13. The bending joints 3, 10 and the pocket 5 allow the rolling element 6 to rotate and move freely in one plane, with the movements of the rolling element in a defined plane, preferably a plane including the shaft center of the object tested, then being measured or registered.

As seen in FIG. 2, the hydrostatic pocket 5 encompasses a ball site or seat 5a, a lubricating fluid outlet 5b, and a lubricating fluid inlet 5c. The fluid inlet receives a restricted pressurized fluid which passes through the inlet 5c and flows to the outlet 5b. The fluid flowing through the outlet 5b separates the ball 6 from the seat where the ball 6 brings lubricating fluid with it during rotation to lubricate the contact between the rolling element and the object 11 being measured.

The rolling/rotating element 6, which preferably is made of ceramic material to ensure a long life, abuts against the object 11 to be tested. In the embodiment shown, the object to be tested is a ball bearing ring fixedly arranged or connected to a rigid shaft 12 as seen in FIG. 1. In such a case, the rolling/rotating element 6 takes the shape of a bearing ball having a geometry that is the same as or similar to the ball in the ball bearing as assembled using the tested ring. This provides conditions simulating those in an assembled bearing.

The apparatus according to the present invention as described above operates in the following manner. A ring 11 that is to be tested is connected to the rigid shaft 12, and the shaft 12 is rotated via an electric or pneumatic motor or free running after speeding up. The rolling/rotating element 6 (i.e., the ball in the illustrated embodiment) located in the hydrostatic pocket is applied to the surface of the ring 11 using a load applied by the air bellow 4. When the ring 11 rotates, the waviness of the surface is transferred via the rolling element 6 to the bridge 2 and is sensed and transduced. Any movements normal to the ring track surface (i.e., ring to ball contact) will be transferred via the capacitive sensor 8 as the bridge 2 moves in its longitudinal direction in the bending joint 3. The movements obtained are thus transduced via the sensors to monitoring equipment 15 which is schematically shown in FIG. 1. The transduced signal is interpreted and shows the waviness related to the ring object as tested. The determination will reflect the conditions under which a bearing has been produced as well. The measurement can thus be used for registering the condition of the process equipment used in manufacturing the bearing part in question. The measurement can also be used to predict migration of the assembled bearing.

Sidewise movements of the ball 6 (i.e., movements perpendicular to the normal direction of the ring-ball contact) are sensed and registered via the sensor 13 at the bending joint 10. This thus provides further information concerning the waviness of the object tested.

FIG. 3 shows on an enlarged scale a ring surface. The point mark in the centre of the oval shows the point area of a pick-up of known measuring apparatus, whereas the oval surface shows the contact area of a ball used in accordance with the present invention. Below the surface, 21 denotes the volume of material which is influenced by the ball in use, i.e., while being placed in a bearing on, for example, a rotating shaft. As is evident from FIG. 3, the ball influences and is influenced by a real or true area, rather than by a pick-up end. Thus, the pick-up end will react in a more uncontrollable manner upon reaching an unevenness on the surface than will the ball. Thus, the ball will show the unevenness occurring under practical conditions rather than in a mere testing environment. Further, the ball can be loaded with such a force as to mimic or accurately simulate a true situation, which the pick-up cannot.

In situations where balls or rollers are to be tested rather than a ring, the balls or rollers are placed between ceramic plates or rings under a pressuring load. One of the plates or rings is placed in or connected to the hydrostatic pocket or bearing to provide a rigid low friction support. The motion of the plate/ring is then monitored when rotating the ball or roller. Thus, a measurement can take place using the ring as well.

The principles, preferred embodiment, and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A method for measuring waviness of a surface in a bearing part that is adapted to contact a bearing component along a contact area to form with the bearing component an assembled bearing, comprising:

applying a substantially constant force to a freely movable control element mounted in a hydrostatic pocket or kept in a bearing arrangement to press the control element against the surface of the bearing part to be measured along the contact area, the control element having a geometry around the contact area that is substantially the same as in the bearing component;

moving the control element across said surface of the bearing part;

measuring movement of the control element; and producing a signal corresponding to the waviness of the surface of the bearing part based on the measured movement of the control element.

2. The method according to claim 1, wherein the control element is loaded with the substantially constant force to obtain a loading area which is representative of conditions existing in the assembled bearing.

3. The method according to claim 1, wherein the movement of the control element includes moving the bearing part in a manner that is the same as when the bearing part is used in the assembled bearing.

4. The method according to claim 1, wherein said step of measuring movement includes monitoring movement in a direction of application of the force by way of a motion sensor and monitoring movements in a direction perpendicular to the direction of application of the force by way of a further motion sensor.

5. The method according to claim 1, wherein the step of applying a substantially constant force to a freely movable control element includes applying a substantially constant force to a freely movable control element that is made of a ceramic material.

6. The method according to claim 1, wherein the step of applying a substantially constant force to a freely movable control element includes applying a substantially constant force to a freely movable ball of a ball bearing.

7. The method according to claim 1, wherein the step of measuring movement of the control element involves measuring movement of the hydrostatic pocket.

8. A method for measuring waviness of a surface in a bearing part that is adapted to cooperate with a bearing component to form an assembled bearing, comprising:

loading a control element located in a hydrostatic pocket with a substantially constant force to press the control element against the surface of the bearing part, the control element having a geometry similar to the bearing component;

allowing the control element to move across said surface of the bearing part;

measuring movement of the control element; and producing a signal corresponding to the waviness of the surface of the bearing part based on the measured movement of the control element.

9. The method according to claim 8, wherein said step of measuring movement includes monitoring movement in a direction of loading of the control element by way of a motion sensor.

10. The method according to claim 9, wherein said step of measuring movement includes monitoring movement in a direction perpendicular to a direction of loading of the control element by way of a further motion sensor.

11. The method according to claim 8, wherein said step of measuring movement includes monitoring movement in a direction perpendicular to a direction of loading of the control element by way of a motion sensor.

12. The method according to claim 8, wherein the step of measuring movement of the control element involves measuring movement of the hydrostatic pocket.

13. Apparatus for measuring waviness of a surface in a bearing part that is adapted to cooperate with a bearing component to form an assembled bearing comprising:

a movable control element for being applied against the surface of the bearing part to be measured, the control element having a geometry similar to a geometry of the bearing component;

means on which the control element is carried for allowing free rotation of the control element;

means for applying a load force to the control element to press the control element against the surface of the bearing part to be measured;

means for carrying and rotating the bearing part to be tested;

at least one sensor for measuring movement of the control element; and means for producing, based on output from the at least one sensor, a signal corresponding to the waviness of the surface of the bearing part.

14. The apparatus according to claim 13, wherein said at least one sensor includes a pair of sensors.

15. The apparatus according to claim 13, wherein said at least one sensor is a sensor that measures movement in a direction parallel to the load force.

16. The apparatus according to claim 13, wherein said at least one sensor is a sensor that measures movement in a direction perpendicular to the load force.

17. The apparatus according to claim 13, wherein said means on which the control element is carried is a hydrostatic pocket.

18. The apparatus according to claim 13, wherein said control element is a ball.

19. The apparatus according to claim 18, wherein said ball is made of ceramic material.

* * * * *